United States Patent Office 3,316,211
Patented Apr. 25, 1967

3,316,211
PROCESS OF PREPARING AROMATIC POLYAMIDE-ESTERS
Rudolph J. Angelo, Wilmington, Del., assignor to E. I. du Pont de Nemours and Company, Wilmington, Del., a corporation of Delaware
No Drawing. Filed Sept. 25, 1963, Ser. No. 311,307
5 Claims. (Cl. 260—47)

This invention relates to the preparation of aromatic polyimide articles and coatings. More particularly, it relates to the preparation of relatively stable intermediates that can be easily converted to the polyimides when desired.

The importance of relatively stable intermediates that can be easily converted to the final desired product can be appreciated by one skilled in the art. The final products, the aromatic polyimides, are known for their chemical and thermal stability. Since they do not melt easily nor dissolve easily, the difficulty of shaping this polymer into useful articles is a serious obstacle to commercial development. Recently, processes utilizing the shaping of a polyamide-acid intermediate followed by conversion to the polyimide have been proposed. However, the polyamide-acids, in many cases, tend to convert to polyimides during storage or, in some cases, are of high stability, converting only upon exposure to temperatures which are extremely high for organic materials.

It is an object of this invention to provide intermediates that are sufficiently stable to be stored for long periods, yet sufficiently "unstable" to convert relatively easily to polyimide when desired. Other objects will appear hereinafter.

The objects are accomplished by the use of an intermediate linear polymer, an aromatic polyamide-ester having the formula:

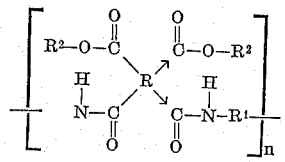

wherein the arrows denote isomerism[1];

R is an aromatic tetravalent organic radical;
R[1] is arylene;
R[2] is methyl; and
$n$ is an integer sufficiently high to provide a film-forming polymer, i.e., having an inherent viscosity at 30° C. of at least 0.1, preferably 0.3–5.0, as measured as a 0.5% solution in a suitable solvent (concentrated sulfuric acid, N,N‑dimethylacetamide, etc.).

The process for producing such polyamide-esters involves the formation of a polyamide-acid by first reacting an aromatic dianhydride and an aromatic diamine under conditions to form the polyamide-acid followed by treatment with diazomethane in a common organic solvent, e.g., ether. The reaction is a very simple one, consisting simply of exposure of the polyamide-acid to a solution of diazomethane in the common solvent. Naturally if the polymer is in solution, the solvent in which it is dissolved should be miscible with that in which the diazomethane is supplied. At least, the polymer solvent must have sufficient affinity for diazomethane to draw it from the solvent in which it is fed to the reaction. The diazomethane solvent should be capable of swelling the polymer if the polymer is in the form of a sheet, film, fiber or other shaped article. The amount of reagent, the time and temperature are determined simply on the basis of the degree of esterification desired, and on the ability to hold the diazomethane in the system, the latter being a problem only at elevated temperatures. To obtain complete esterification, it is necessary to add at least the stoichiometric amount of the diazomethane (at least 1 mole per amide-acid linkage). The esterification is a very clean-cut reaction in the sense that the by-product, gaseous nitrogen, is very easy to remove. The solvents generally are also highly volatile to provide no particular problem in the drying step. Furthermore, any excess diazomethane is also easy to remove by evaporation.

Diazomethane is readily prepared by the alkaline decomposition of a variety of aromatic N-alkyl nitrosamides. For example, p-tolylsulfonylmethylnitrosoamide is available commercially, especially for this purpose. Others can also be obtained commercially and used in the same way, such as, for example, the bis (nitrosoamide) of N,N′-dimethyl terephthalamide.

The first step, the preparation of the polyamide-acid composition, involves reacting at least one aromatic diamine having the structural formula $H_2N$—$R^1$—$NH_2$ with at least one tetracarboxylic acid dianhydride having the structural formula

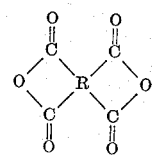

wherein R is a tetravalent aromatic radical and $R^1$ is arylene, in an organic solvent for at least one of the reactants, the solvent being inert to the reactants, preferably under anhydrous conditions, for a time and at a temperature sufficient to provide the polyamide-acid:

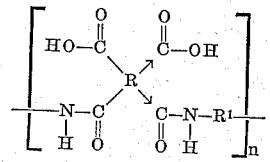

It should be understood that it is not necessary that the polymeric component of the composition be composed entirely of the polyamide-acid. This is particularly true since conversion to the polyimide is contemplated subsequently. For purposes of this invention, it has been found that in most instances the polymeric component of the composition should contain at least 50% of the polyamide-acid; and, in a few instances, less than 50% of the polyamide-acid in the polymeric component will operate.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling with the definitions given above, it is possible to form compositions of 100% polyamide-acid by conducting the reaction below 100° C. However, temperatures up to 175° C. may be tolerated to provide acceptable compositions. The particular temperature below 175° C. that must not be exceeded for any particular combination of diamine, dianhydride, solvent and reaction time to provide a reaction product composed of the desired minimum of polyamide-acid will vary but can be determined by a ---
[1] In any recurring unit the groups to which arrows point may exist as shown or in interchanged position.

simple test by any person of ordinary skill in the art. However, to obtain the maximum inherent viscosity, i.e., maximum degree of polymerization, for any particular combination of diamine, dianhydride, solvent, etc., and thus produce ultimately shaped articles such as films and filaments of optimum toughness, it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain termination agent such as phthalic anhydride may be used to "cap" the ends of the polymer chains.

In the preparation of the polyamide-acid, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g., N,N-dimethylacetamide. To calculate inherent viscosity, the viscosity of the polymer solution is measured relative to that of the solvent alone.

$$\text{Inherent viscosity} = \frac{\text{natural logarithm} \frac{\text{viscosity of solution}}{\text{viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. It has been found that the most successful results are obtained when the solvent represents at least 60% of the final solution. That is, the solution should contain 0.05–40% of the polymeric component.

The starting materials for forming the polyamide-acids are aromatic diamines and aromatic tetracarboxylic acid dianhydrides. The organic diamines are characterized by the formula:

$$H_2N\text{—}R^1\text{—}NH_2$$

wherein $R^1$ is a divalent aromatic radical (arylene), preferably selected from the following groups; phenylene, naphthylene, biphenylene, anthrylene, furylene, benzfurylene and

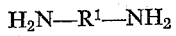

wherein $R^3$ is selected from the group consisting of an alkylene chain having 1–3 carbon atoms,

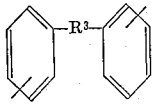

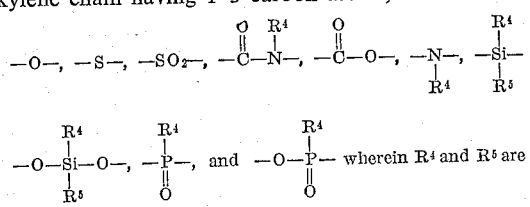

wherein $R^4$ and $R^5$ are alkyl or aryl, and substituted groups thereof. Among the diamines which are suitable for use in the present invention are:

meta-phenylene diamine;
para-phenylene diamine;
2,2-bis(4-amino-phenyl) propane;
4,4'-diamino-diphenyl methane;
4,4'-diamino-diphenyl sulfide;
4,4'-diamino-diphenyl sulfone;
3,3'diamino-diphenyl sulfone;
4,4'-diamino-diphenyl ether;
2,6-diamino-pyridine;
bis-(4-amino-phenyl)diethyl silane;
bis-(4-amino-phenyl) diphenyl silane;
benzidine;
3,3'-dichloro-benzidine;
3,3'-dimethoxy benzidine;
bis-(4-amino-phenyl) ethyl phosphine oxide;
bis-(4-amino-phenyl) phenyl phosphine oxide;
bis-(4-amino-phenyl)-N-butylamine;
bis-(4-amino-phenyl)-N-methylamine;
1,5-diamino-naphthalene;
3,3'-dimethyl-4,4'-diaminobiphenyl;
N-(3-aminophenyl)-4-aminobenzamide;
4-aminophenyl-3-aminobenzoate; and mixtures thereof.

The aromatic tetracarboxylic acid dianhydrides are characterized by the following formula:

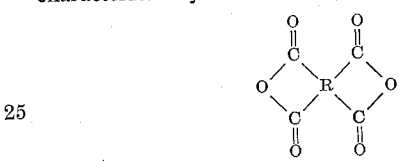

wherein R is a tetravalent aromatic radical, e.g.,

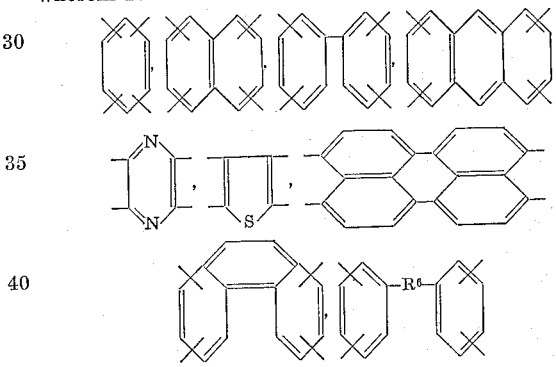

wherein $R^6$ is selected from the group consisting of $R^3$ and

In these dianhydrides every carbonyl group is attached directly to a separate carbon atom of the aromatic radical, the carbonyl groups being in pairs, the groups of each pair being adjacent to each other. Adjacent means ortho or peri, so that the dicarboxylanhydro rings are 5- or 6-membered, respectively.

The preferred aromatic dianhydrides are those in which the carbon atoms of each pair of carbonyl groups are directly attached to ortho carbon atoms in the R group to provide a 5-membered ring as follows:

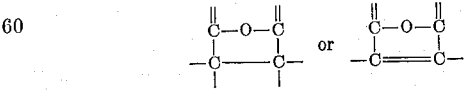

Illustrations of dianhydrides suitable for use in the present invention include:

pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
naphthalene-1,2,4,5-tetracarboxylic dianhydride;

naphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
2,2-bis(2,3dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride;
benzene-1,2,3,4-tetracarboxylic dianhydride;
3,4,3′4′-benzophenone tetracarboxylic dianhydride;
2,3,2′,3′-benzophenone tetracarboxylic dianhydride;
2,3,3′,4′-benzophenone tetracarboxylic dianhydride;
pyrazine-2,3,5,6-tetracarboxylic dianhydride;
thiophene-2,3,4,5-tetracarboxylic dianhydride; etc.

The inclusion of one or more diamines or dianhydrides other than those disclosed e.g., aliphatic diamines or aliphatic dianhydrides, as reactants in the process may detract from one or more desirable properties of the polymeric products. However, the inclusion of such materials, to the extent that they do not detract substantially from the desirable results obtained with the aromatic reactants, is contemplated.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent should be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process. The preferred solvents are the lower molecular weight members of this class, particularly N,N-dimethylformamide and N,N-dimethylacetamide. They may easily be removed from the polyamide-acid and/or polymeric shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used are: dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. These solvents, sometimes known as aprotic solvents, can be used alone, in combinations of solvents, or in combination with poor solvents such as benzene, benzonitrile, dioxane, xylene, toluene and cyclohexane.

In the next step, the polyamide-acid is converted to the polyamide-ester by treatment with diazomethane as discussed previously. The polyamide-ester composition may be stored at this point for later use or it may be immediately used to form shaped articles. After shaping the composition composed predominantly of the polyamide-ester either immediately or after storage or after sale, preferably still in the solvent (usually at least 60% solvent), into a useful article, e.g., filament, film, tube, rod, powder, etc., and drying the article, it is preferred to convert the polyamide-ester to another polymer to modify the properties of the shaped structure. Thus, the polyamide-ester may be converted by heat treatment to the corresponding polyimide, specifically by heating to a temperature of at least 125° C., preferably at least 150° C., to drive off alcohol. At 300° C. the conversion occurs in about 10 minutes. The polyimide has the following structural formula:

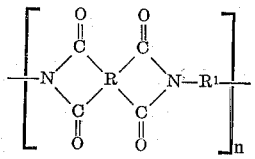

wherein

R is an aromatic tetravalent radical;
R¹ is arylene; and
$n$ is an integer sufficiently high to provide an inherent viscosity of at least 0.1, preferably 0.3–5.0, as measured as a 0.5% solution in a suitable solvent.

The final shaped article may consist of the polyimide alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the intermediate polymer as such or in a solution of the intermediate polymer before shaping. Certain abrasives and electrically conductive materials are better added as surface layers. A cellular form or foam of the final polymer may be produced by adding a conventional blowing agent to the intermediate polymer, either alone or in combination with a filler, followed by heating to decompose the agent and cyclize the polymer units. Alternatively, cellular products can be made by dispersing bubbles (of air, carbon dioxide, nitrogen, etc.) into a melt or solution of the intermediate polymer before shaping and cyclization.

Instead of being shaped itself, the intermediate polymer can be used as a coating composition. The liquid coating composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabric, etc.; polymeric materials such as cellulosic materials (cellophane, wood, paper, etc.) polyolefins (polyethylene, polypropylene, polystyrene, etc.); polyesters (polyethylene terephthalate, etc.), polyamides, polyimides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. Films of the final cyclized polymer can be laminated to any of the above substrates, often with the aid of a commercially available adhesive.

The polyamide-esters, when isolated, are found to be colorless or light yellow solids. They have strong infrared bands at 3.0–3.07 microns due to N—H bonds of the amide, 5.8 microns due to C=O bonds of the ester and 6.05 microns due to C=O bonds of the amide.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques [2] known to those skilled in the art. The majority of the infrared spectra herein were taken on cast films by the use of a Perkin-Elmer Model 21 Spectrophotometer and a Perkin-Elmer Infracord Spectrophotometer.

Inherent viscosity, which is directly related to the molecular weight of the polymer, is defined by L. H. Cragg in the Journal of Colloid Science, volume I, pages 261–9 (May 1946) as:

$$\text{Inherent viscosity} = \frac{In \text{ relative viscosity}}{C}$$

where relative viscosity is the ratio of the solution viscosity to the solvent viscosity, and C is the concentration of solute in solution measured as grams of polymer per 100 ml. of solution.

Example 1

A mixture of 29.7 g. (0.15 mole) of 4,4'-diaminodiphenyl methane and 32.70 g. (0.15 mole) of pyromellitic dianhydride is dissolved in 266 ml. of dimethylformamide at room temperature. The solution is agitated without supplemental heating or cooling until it has become extremely viscous. Then dimethylformamide is added to dilute the solution to 15% solids. The inherent viscosity of a sample of the polyamide-acid product is found to be 2.2 (as a 0.5% solution in DMF at 30° C.).

An ether solution of diazomethane is added to the polyamide-acid solution until stoichiometric equivalence has been attained. The ether and excess diazomethane are evaporated from the reaction mixture. The solution is found to contain the desired polyamide-acid methyl ester having an inherent viscosity of about 2. This solution is stored at room temperature until ready for shaping. The polyamide-ester converts readily to the corresponding polyimide on heating at 200–300° C.

Example 2

A film of the polyamide-acid described in Example 1 wet with N,N-dimethylacetamide is exposed to an ether solution of diazomethane containing a considerable stoichiometric excess of diazomethane over that calculated on the basis of carboxyl groups in the polymer. On evaporation of the excess diazomethane, the ether and the dimethylformamide, the product is found to be polyamide-acid methyl ester of good quality. It is converted thermally to the corresponding polyimide as described above.

Examples 3–7

The corresponding polyamide-acid methyl esters are obtained by the procedure of Example 1 by substituting the polyamide-acids based upon each of the following tetracarboxylic acids:

3,4,3'4'-benzophenone tetracarboxylic acid
2,2-bis(3,4-dicarboxyphenyl)propane
bis(3-4-dicarboxyphenyl)sulfone
bis(3,4-dicarboxyphenyl)ether
3,4,3'4'-diphenyltetracarboxylic acid.

Examples 8–12

Likewise, the corresponding polyamide-acid methyl esters result by substituting in Example 1 polyamide-acids based upon each of the following diamines:

m-phenylene diamine
4,4'-diaminodiphenyl sulfone
4,4'-diaminodiphenyl ether
4,4'-diaminodiphenyl propane
2,4-diaminocumene.

---

[2] W. M. D. Bryant and R. C. Voter, Journal of American Chemical Society, 75, 6113 (1953); and F. W. Billmeyer, "Textbook of Polymer Chemistry," chapter 7, Interscience Publishers 1957.

Example 13

The procedure of Example 2 is repeated, allowing the diazomethane to evaporate from its solution so that diazomethane vapor makes contact with the gel film. The diazomethane penetrates the film by dissolving in the N,N-dimethylacetamide. Reaction to produce the methyl ester of the polymer occurs quite rapidly.

What is claimed is:

1. A process for preparing shapable polymeric compositions which comprises reacting at least one diamine having the structural formula $$H_2N-R^1-NH_2$$

wherein $R^1$ is arylene, the two amino groups of said diamine each attached to separate carbon atoms of $R^1$; with at least one aromatic tetracarboxylic acid dianhydride,

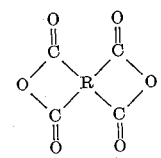

wherein the four carbonyl groups of said dianhydride are directly attached to an aromatic ring of said dianhydride in an organic solvent for at least said diamine, said solvent being inert to the system, while maintaining the temperature throughout the reaction sufficiently below 175° C. to form a polymeric component containing at least about 50 percent of a polyamide-acid of the formula:

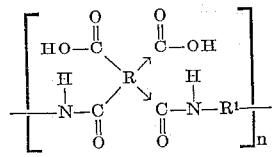

wherein the arrow denotes isomerism;
R is an aromatic tetravalent organic radical;
$R^1$ is arylene; and
n is an integer sufficiently high to provide a film-forming polymer;

treating said polyamide-acid with diazomethane to form a polyamide-ester of the formula

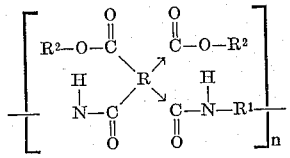

wherein the arrow denotes isomerism;
R is a naromatic tetravalent organic radical;
$R^1$ is arylene;
$R^2$ is methyl; and
n is an integer sufficiently high to provide a film-forming polymer.

2. A process as in claim 1 wherein said dianhydride is selected from the group consisting of pyromellitic dianhydride, 3,3',4,4'-diphenyl tetracarboxylic dianhydride, 2,2-bis(3,4-dicarboxyphenyl) propane dianhydride, bis-(3,4-dicarboxyphenyl) sulfone dianhydride, bis(3,4-dicarboxyphenyl) ether dianhydride and 3,4,3'4'-benzophenone tetracarboxylic dianhydride.

3. A process as in claim 1 wherein said diamine is selected from the group consisting of metaphenylenediamine, 4,4' - diamino-diphenyl propane, 4,4' - diamino-diphenyl methane, 4,4' - diamino-diphenyl ether, 4,4' - diamino-diphenyl sulfone and 2,4-diaminocumene.

4. A process which comprises reacting polyamide-acid of the formula:

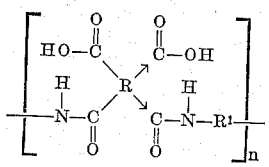

wherein the arrow denotes isomerism;
R is an aromatic tetravalent organic radical;
$R^1$ is arylene; and
$n$ is an integer sufficiently high to provide a film-forming polymer;
with diazomethane to form a polyamide-ester of the formula:

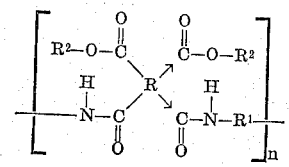

wherein the arrow denotes isomerism;
R is an aromatic tetravalent organic radical;
$R^1$ is arylene;
$R^2$ is methyl; and
$n$ is an integer sufficiently high to provide a film-forming polymer.

5. A process as in claim 4 in which the polyamide-acid is treated with the diazomethane while the acid is in the form of a gel film.

References Cited by the Examiner

UNITED STATES PATENTS

| | | | |
|---|---|---|---|
| 3,037,966 | 6/1962 | Chow et al | 260—78 |
| 3,179,633 | 4/1965 | Endrey | 260—78 |
| 3,179,634 | 4/1965 | Edwards | 260—78 |
| 3,190,856 | 6/1965 | Lavin | 260—78 |

WILLIAM H. SHORT, *Primary Examiner.*

H. D. ANDERSON, *Assistant Examiner.*